(12) United States Patent
Bergman et al.

(10) Patent No.: US 11,687,746 B2
(45) Date of Patent: Jun. 27, 2023

(54) METHODS AND APPARATUSES FOR DETERMINING FREQUENCY RESPONSE OF A SECURITY TAG

(71) Applicant: Sensormatic Electronics, LLC, Boca Raton, FL (US)

(72) Inventors: Adam S. Bergman, Boca Raton, FL (US); Steve E. Trivelpiece, Rancho Santa Margarita, CA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 17/537,115

(22) Filed: Nov. 29, 2021

(65) Prior Publication Data

US 2022/0171950 A1      Jun. 2, 2022

Related U.S. Application Data

(60) Provisional application No. 63/119,361, filed on Nov. 30, 2020.

(51) Int. Cl.
*G06K 7/10* (2006.01)
*G08B 13/24* (2006.01)

(52) U.S. Cl.
CPC ..... *G06K 7/10366* (2013.01); *G08B 13/2417* (2013.01)

(58) Field of Classification Search
CPC ........................ G06K 7/10366; G08B 13/2417
USPC ......................................................... 235/451
See application file for complete search history.

(56) References Cited

U.S. PATENT DOCUMENTS

| 7,772,978 B1 | 8/2010 | Somogyi et al. |
| 8,988,199 B1 | 3/2015 | Moretti et al. |
| 2012/0019399 A1 | 1/2012 | Vargo et al. |

OTHER PUBLICATIONS

International Search Report and Written Opinion for International Patent Application No. PCT/US2021/061229, dated Mar. 18, 2022 (71 pages).

*Primary Examiner* — Daniel A Hess
(74) *Attorney, Agent, or Firm* — ArentFox Schiff LLP

(57) ABSTRACT

Aspects of the present disclosure include methods, systems, and non-transitory computer readable media for transmitting at least one incident radio frequency identification (RFID) signal to a RFID tag attached to a merchandize item, receiving at least one reflected RFID signal from the RFID tag, determining a frequency response of the RFID tag based on the at least one reflected RFID signal, comparing the frequency response to a plurality of baseline frequency responses, and determining a state of the RFID tag based on the comparing.

24 Claims, 3 Drawing Sheets

METHODS AND APPARATUSES FOR DETERMINING FREQUENCY RESPONSE OF A SECURITY TAG

CROSS-REFERENCE TO RELATED APPLICATIONS

The current application claims priority to, and the benefit of, U.S. Provisional Application No. 63/119,361 filed on Nov. 30, 2020, entitled "METHODS AND APPARATUSES FOR DETERMINING FREQUENCY RESPONSE OF A SECURITY TAG," the contents of which are hereby incorporated by reference in their entireties.

BACKGROUND

A retail store may encounter loss due to theft, fraud, or mistakes. For example, a thief may remove a merchandize item from the retail store without proper payment. Additionally, store employees may cause loss due to operational errors (e.g., misplace merchandize items during restocking or shelfing), theft, "sweethearting" (offering discounted or free merchandize items to friends or family), and/or damage. While a retail store may employ security personnel, surveillance, and/or analytical methods to minimize loss, it may be desirable to rely on other countermeasures for loss prevention.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure include methods transmitting at least one incident radio frequency identification (RFID) signal to a RFID tag attached to a merchandize item, receiving at least one reflected RFID signal from the RFID tag, determining a frequency response of the RFID tag based on the at least one reflected RFID signal, comparing the frequency response to a plurality of baseline frequency responses, and determining a state of the RFID tag based on the comparing.

An aspect of the present disclosure includes a RFID reader including a memory including instructions, and a processor configured to execute the instructions that cause the RFID reader to transmit at least one incident radio frequency identification (RFID) signal to a RFID tag attached to a merchandize item, receive at least one reflected RFID signal from the RFID tag, determine a frequency response of the RFID tag based on the at least one reflected RFID signal, compare the frequency response to a plurality of baseline frequency responses, and determine a state of the RFID tag based on the comparing.

Aspects of the present disclosure include a non-transitory computer readable medium having instructions that, when executed by a processor, cause the processor to transmit at least one incident radio frequency identification (RFID) signal to a RFID tag attached to a merchandize item, receive at least one reflected RFID signal from the RFID tag, determine a frequency response of the RFID tag based on the at least one reflected RFID signal, compare the frequency response to a plurality of baseline frequency responses, and determine a state of the RFID tag based on the comparing.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

Aspects of the present disclosure may include performing various measurements of radio frequency identification (RFID) sensors/tags in free space and store results in a RFID reader for a later comparison, such as when the RFID sensors/tags are read by the RFID reader. The measurements may include: tag power response vs. frequency, received signal strength indication (RSSI) vs. read power, phase vs. frequency, or other responses. When the RFID sensors/tags approach the RFID reader near the exit, the RFID reader may take the same measurements and compare the results to determine whether garments having the RFID sensors/tags have a high probability of being worn (or close to the body) instead of being carried. The measurement comparisons may enhance decisions that the garment is moving within the retail space.

Figure 1:
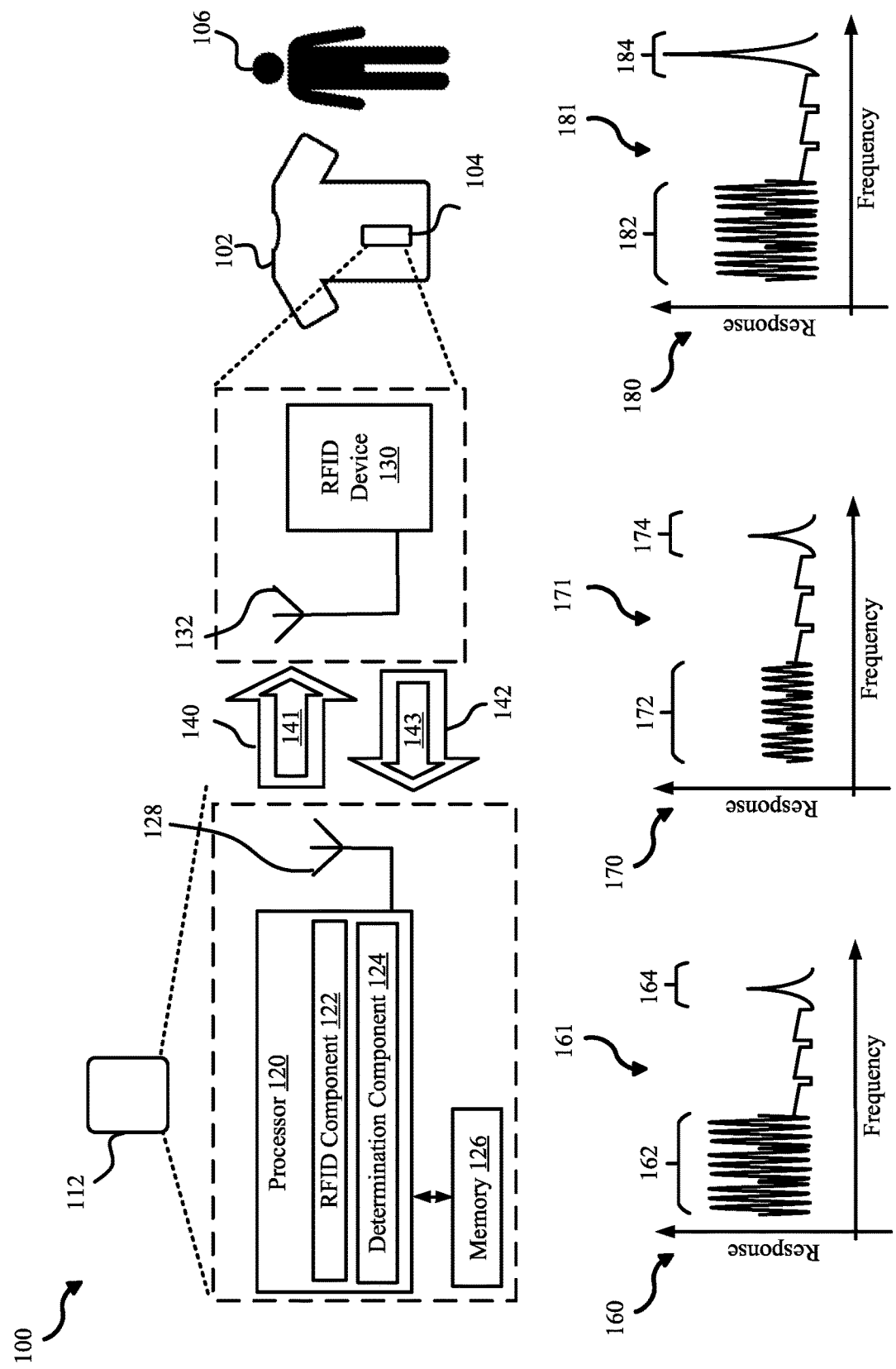
FIG. 1 illustrates an example of an environment for determining a frequency response of a RFID tag in accordance with aspects of the present disclosure.

Referring to FIG. 1, in a non-limiting implementation, an example of an environment 100 (e.g., a retail store) for determining a frequency response of a RFID tag 104 attached to a merchandise item 102. The merchandise item 102 may be carried or worn by the person 106. The frequency response of the RFID tag 104 may be different when the merchandise item 102 is being carried or worn by the person 106.

In one aspect of the present disclosure, the environment 100 may include a RFID reader 112 configured to transmit and/or receive RFID signals. The RFID reader 112 may include a processor 120 that executes instructions stored in a memory 126 for determining the frequency response of the RFID tag 104 as described below. Based on the frequency response of the RFID tag 104, the processor 120 may determine a state (e.g., being carried or worn, static or moving, etc.) of the RFID tag 104. The RFID reader 112 may include the memory 126.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein. The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). Examples of the memory 126 may include one or more non-transitory computer readable media.

In some implementations, the RFID reader 112 may include a RFID component 122 configured to generate, encode, decode, transmit and/or receive RFID signals via a reader antenna 128. The RFID reader 112 may include a determination component 124 configured to determine the frequency response of the RFID tag 104 and/or the state of the RFID tag 104 based on the RFID signals. One or more of the RFID component 122 and/or the determination component 124 may be configured as hardware (e.g., application specific integrated circuit, application processors, field programmable gate arrays, etc.), software (e.g., instructions stored in the memory 126 and executed by the processor 120 of the RFID reader 112), or a combination thereof. The RFID reader may include the reader antenna 128 configured to transmit and/or receive RFID signals. The reader antenna 128 may be a dipole antenna, a coil, or other suitable antennas.

In certain implementations, the RFID tag 104 may include a RFID device 130 configured to receive and/or backscatter RFID signals via the tag antenna 132. The tag antenna 132 may be a dipole antenna, a coil, or other suitable antennas During operation, in some aspects of the present disclosure, the RFID reader 112, the RFID component 122, and/or the reader antenna 128 may transmit at least one incident RFID signal 140 to the RFID tag 104. The at least one incident RFID signal 140 may include at least one reader RFID signal 141 for inducing at least one backscattered RFID signal 143 carrying data. The at least one incident RFID signal 140 may include additional signals (e.g., different frequencies, amplitude, phases, etc.) for inducing the frequency response of the RFID tag 104.

In certain aspects, the tag antenna 132 and/or the RFID device 130 may receive the at least one reader RFID signal 141 of the at least one incident RFID signal 140, and backscatter the at least one backscattered RFID signal 143 to the RFID reader 112. The at least one backscattered RFID signal 143 may carry data in response to the at least one reader RFID signal 141. For example, the RFID device 130 may receive the at least one reader RFID signal 141 of the at least one incident RFID signal 140 via the tag antenna 132. The RFID device 130 may include internal electronic components (not shown) that generate the at least one backscattered RFID signal 143 in response to receiving the at least one reader RFID signal 141. Specifically, a portion of the energy of the at least one reader RFID signal 141 may be converted, by the RFID device 130, for generating the at least one backscattered RFID signal 143. The RFID device 130 may backscatter the at least one backscattered RFID signal 143 via the tag antenna 132 to the RFID reader 112.

In certain implementations, the RFID tag 104 may reflect at least one reflected RFID signal 142 in response to the at least one incident RFID signal 140. The at least one reflected RFID signal 142 may include the at least one backscattered RFID signal 143 and other electromagnetic waves reflected by the RFID tag 104 in response to the at least one incident RFID signal 140.

In some implementations, the determination component 124 of the RFID reader 112 may determine the frequency response of the RFID tag 104 based on the at least one reflected RFID signal 142. The frequency response may be generated based on amplitude information, phase, information, and/or frequency information of the at least one reflected RFID signal 142. In one example, the determination component 124 may determine the power response of the at least one reflected RFID signal 142 over a certain frequency range (e.g., 902 to 920 megahertz). That is, the determination component 124 may determine the amount of received electromagnetic energy of the at least one reflected RFID signal 142 at multiple frequencies. In another implementation, the determination component 124 may determine the phases of the at least one reflected RFID signal 142 at multiple frequencies. In some implementations, the determination component 124 may determine other frequency responses. In alternative implementations, the determination component 124 may determine other signal responses of the RFID tag 104 based on the at least one reflected signals (e.g., RSSI vs. read power, distance from the RFID reader 112 vs. frequency, change in distance vs. frequency, etc.).

In certain aspects of the present disclosure, the determination component 124 may compare the frequency response of the RFID tag 104 with baseline frequency responses stored locally (e.g., in the memory 126) or remotely (e.g., in the cloud). The baseline frequency responses may include the frequency response of the RFID tag 104 being placed "away" from a human body (i.e., greater than a threshold distance, such as 0.5 millimeter (mm) or 1 centimeter (cm), from the human body), which may be interpreted as a customer carrying the merchandize item 102 being attached to the RFID tag 104. The baseline frequency responses may include the frequency response of the RFID tag 104 being placed "close" to a human body (i.e., less than the threshold distance from the human body), which may be interpreted as a potential thief wearing the merchandize item 102 being attached to the RFID tag 104 without payment. The baseline frequency responses may include the frequency response of the RFID tag 104 being moved above a threshold speed (e.g., 2 meter per second (m/s), 5 m/s, etc.), which may be interpreted as a potential thief running out of the retail store with the merchandise item 102 without payment. The baseline frequency responses may include the frequency response of the RFID tag 104 being moved below the threshold speed, which may be interpreted as the customer browsing in the retail store. Other baseline frequency responses may also be stored (e.g., frequency response of the RFID tag 104 being placed within a threshold distance from an inanimate object, such as a shelf). The comparison may include a portion or all of the frequency response.

In some aspects, the determination component 124 may determine state information (e.g., RFID tag 104 being stationary or moving, and/or the merchandise item 102 being carried or worn, etc.) based on the comparison. If the determination component 124 identifies a baseline frequency response that matches (e.g., a portion or an entire frequency response is similar with less than a threshold deviation value or percentage) the frequency response of the RFID tag 104, the determination component 124 may determine that the RFID tag 104 is in the state associated with the base station frequency response.

In some implementations, the determination component 124 may determine the state information after a plurality of matches between the frequency response of the RFID tag 104 and a baseline frequency response. The determination component 124 may determine a plurality of state information over a range of time. The determination component 124 may assign a confidence probability of the match based on the comparison between the frequency response of the RFID tag 104 and a baseline frequency response. For example, depending on amount of overlap and/or deviation between the frequency response of the RFID tag 104 and a baseline frequency response, the determination component 124 may generate a confidence probability (e.g., more overlap equals to higher confidence).

In optional implementations, the RFID reader 112 may transmit a plurality of incident RFID signals to determine the state information. The plurality of incident RFID signals may be transmitted over a range of time. The plurality of incident RFID signals may have different transmission power levels, frequencies, phases, etc.

In a non-limiting example, the RFID reader 112 may store (locally or remotely) a first baseline frequency response 161 shown in a first graph 160, a second baseline frequency response 171 shown in a second graph 170, and a third baseline frequency response 181 shown in a third graph 180. The first baseline frequency response 161 may represent the frequency response of the RFID tag 104 moving below a threshold speed and placed greater than a threshold distance away from a human body. The second baseline frequency response 171 may represent the frequency response of the RFID tag 104 moving above a threshold speed. The third baseline frequency response 181 may represent the frequency response of the RFID tag 104 being placed within a threshold distance from a human body. When the movement speed of the RFID tag 104 increases from below the threshold speed to above the threshold speed, a first portion 162 of the first baseline frequency response 161 may change to a first portion 172 of the second baseline frequency response while the second portions 164, 174 remain unchanged. When the distance between the RFID tag 104 changes from greater than the threshold distance to less than the threshold distance, the second portion 164 of the first baseline frequency response 161 may change to a second portion 184 of the third baseline frequency response 181 while the first portions 162, 182 remain unchanged. The determination component 124 may compare the frequency response to the first baseline frequency response 161, the second baseline frequency response 171, and the third baseline frequency response 181. The determination component 124 may determine whether the frequency response matches the first frequency response 161, the second frequency response 171, or the third frequency response 181.

Figure 2:
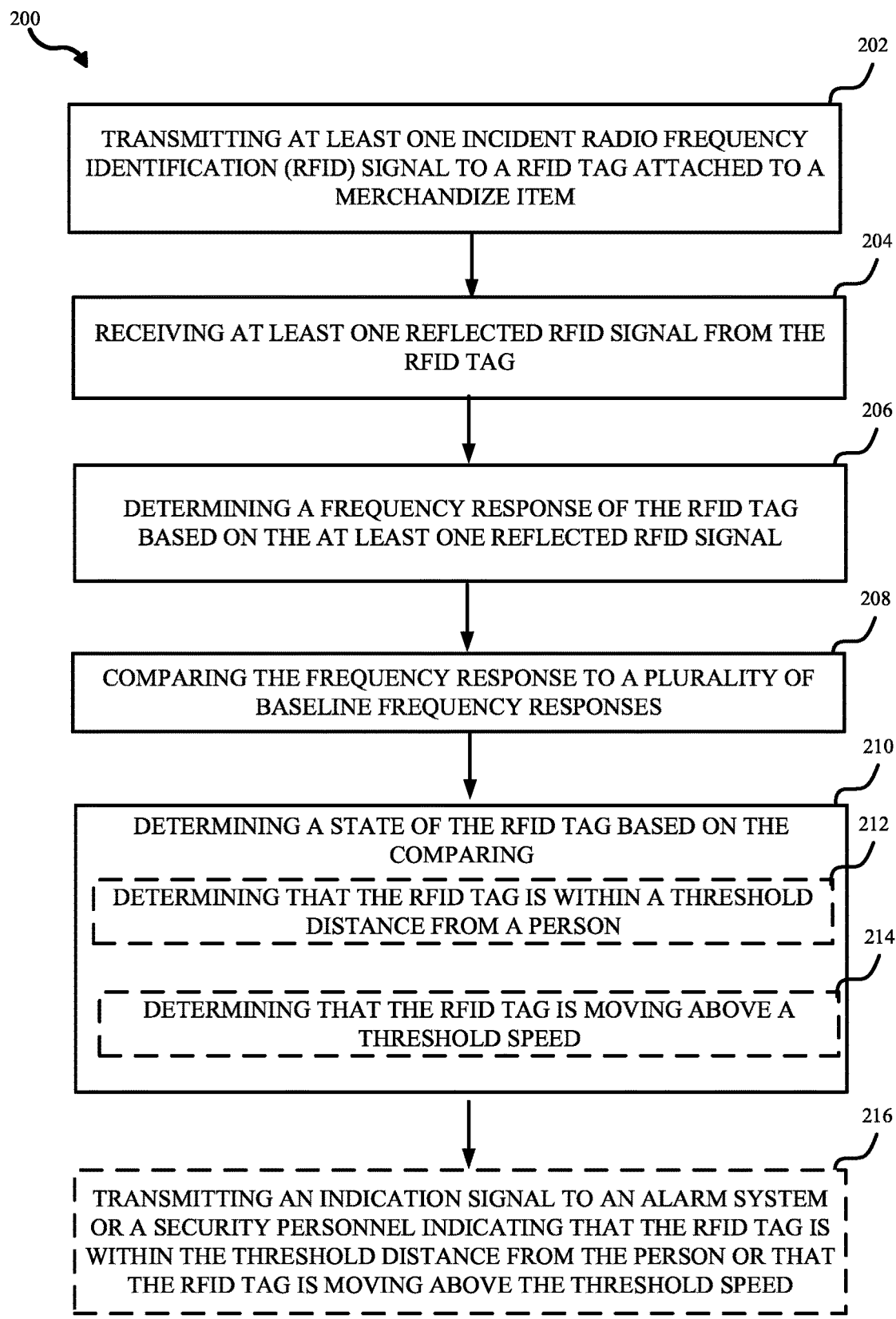
FIG. 2 illustrates an example of a method for determining a frequency response of a RFID tag accordance with aspects of the present disclosure.

Turning to FIG. 2, an example of a method 200 for determining a state of the RFID tag 104. Specifically, the method 200 may be performed by one or more of the processor 120, the RFID component 122, the determination component 124, the reader antenna 128, and/or the memory 126 of the RFID reader 112.

At block 202, the method 200 may transmit at least one incident radio frequency identification (RFID) signal to a RFID tag attached to a merchandize item. For example, the processor 120, the RFID component 122, the reader antenna 128, and/or the memory 126 of the RFID reader 112 may transmit the at least one incident RFID signal 140 to the RFID tag 104 as described above. The processor 120, the RFID component 122, the reader antenna 128, and/or the memory 126 may be configured to and/or define means for transmitting at least one incident RFID signal to a RFID tag attached to a merchandize item.

At block 204, the method 200 may receive at least one reflected RFID signal from the RFID tag. For example, the processor 120, the RFID component 122, the reader antenna 128, and/or the memory 126 of the RFID reader 112 may receive the at least one reflected RFID signal 142 from the RFID tag 104 as described above. The processor 120, the RFID component 122, the reader antenna 128, and/or the memory 126 may be configured to and/or define means for receiving at least one reflected RFID signal from the RFID tag.

At block 206, the method 200 may determine a frequency response of the RFID tag based on the at least one reflected RFID signal. For example, the processor 120, the memory 126, and/or the determination component 124 may determine the frequency response of the RFID tag 104 as described above. The processor 120, the memory 126, and/or the determination component 124 may be configured to and/or define means for determining a frequency response of the RFID tag based on the at least one reflected RFID signal.

At block 208, the method 200 may compare the frequency response to a plurality of baseline frequency responses. For example, the processor 120, the memory 126, and/or the determination component 124 may compare the frequency response of the RFID tag 104 to the baseline frequency responses 161, 171, 181, as described above. The processor 120, the memory 126, and/or the determination component 124 may be configured to and/or define means for comparing the frequency response to a plurality of baseline frequency responses.

At block 210, the method 200 may determine a state of the RFID tag based on the comparison. For example, the processor 120, the memory 126, and/or the determination component 124 may determine a state the RFID 104 as described above. The processor 120, the memory 126, and/or the determination component 124 may be configured to and/or define means for determining a state of the RFID tag based on the comparison.

At block 212, the method 200 may optionally determine that the RFID tag is within a threshold distance from a person. For example, the processor 120, the memory 126, and/or the determination component 124 may determine that the RFID 104 is within a threshold distance from the person 106 as described above. The processor 120, the memory 126, and/or the determination component 124 may be configured to and/or define means for determining that the RFID tag is within a threshold distance from a person.

At block 214, the method 200 may optionally determine that the RFID tag is moving above a threshold speed. For example, the processor 120, the memory 126, and/or the determination component 124 may determine that the RFID 104 is moving above a threshold speed as described above. The processor 120, the memory 126, and/or the determination component 124 may be configured to and/or define means for determining that the RFID tag is moving above a threshold speed.

At block 216, the method 200 may optionally transit an indication signal to an alarm system or a security personnel indicating that the RFID tag is within the threshold distance from the person and/or that the RFID tag is moving above the threshold speed. For example, the processor 120 and/or the memory 126 may transmit an indication signal to an alarm system (not shown) or a security personnel (not shown) indicating that the RFID tag 104 is within the threshold distance from the person and/or that the RFID tag 104 is moving above the threshold speed.

Aspects of the present disclosure includes the method 200 above, wherein determining the frequency response comprises determining one of a power response, a received signal strength indication, or phase information.

Aspects of the present disclosure includes any of the methods above, wherein determining the state of the RFID tag comprises determining that the RFID tag is within a threshold distance from a person.

Aspects of the present disclosure includes any of the methods above, further comprising transmitting an indication signal to an alarm system or a security personnel indicating that the RFID tag is within the threshold distance from the person in response to determining that the RFID tag is within the threshold distance.

Aspects of the present disclosure includes any of the methods above, wherein determining the state of the RFID tag comprises determining that the RFID tag is moving above a threshold speed.

Aspects of the present disclosure includes any of the methods above, further comprising transmitting an indication signal to an alarm system or a security personnel indicating that the RFID tag is moving above the threshold speed in response to determining that the RFID tag is moving above the threshold speed.

Aspects of the present disclosure includes any of the methods above, further comprising transmitting a second incident RFID signal to the RFID tag, receiving a second reflected RFID signal from the RFID tag, determining a second frequency response of the RFID tag based on the second reflected RFID signal, comparing the second frequency response to the plurality of baseline frequency responses, and determining a state change of the RFID tag based on comparing the frequency response to a plurality of baseline frequency responses and comparing the second frequency response to the plurality of baseline frequency responses.

Aspects of the present disclosure includes any of the methods above, wherein the state change includes at least one of a change in a distance between the RFID tag and the reader, a change in proximity between the RFID tag and an object, or a change in a movement speed of the RFID tag.

Aspects of the present disclosure includes any of the methods above, wherein the object is a human body or a shelf.

Figure 3:
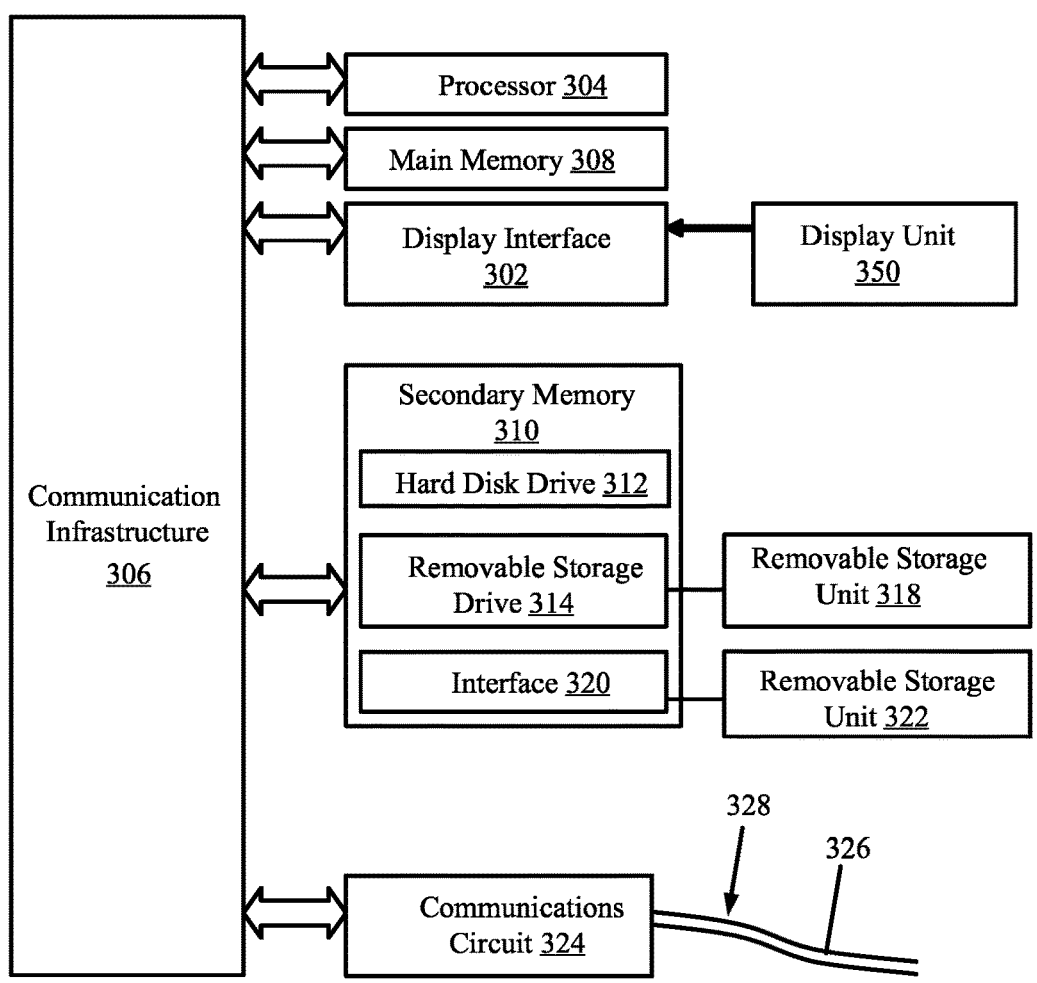
FIG. 3 illustrates an example of a computer system in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 300 is shown in FIG. 3. In some examples, the RFID reader 112 may be implemented as the computer system 300 shown in FIG. 3. The RFID reader 112 may include some or all of the components of the computer system 300.

The computer system 300 includes one or more processors, such as processor 304. The processor 304 is connected with a communication infrastructure 306 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 300 may include a display interface 302 that forwards graphics, text, and other data from the communication infrastructure 306 (or from a frame buffer not shown) for display on a display unit 350. Computer system 300 also includes a main memory 308, preferably random access memory (RAM), and may also include a secondary memory 310. The secondary memory 310 may include, for example, a hard disk drive 312, and/or a removable storage drive 314, representing a floppy disk drive, a magnetic tape drive, an optical disk drive, a universal serial bus (USB) flash drive, etc. The removable storage drive 314 reads from and/or writes to a removable storage unit 318 in a well-known manner. Removable storage unit 318 represents a floppy disk, magnetic tape, optical disk, USB flash drive etc., which is read by and written to removable storage drive 314. As will be appreciated, the removable storage unit 318 includes a computer usable storage medium having stored therein computer software and/or data. In some examples, one or more of the main memory 308, the secondary memory 310, the removable storage unit 318, and/or the removable storage unit 322 may be a non-transitory memory.

Alternative aspects of the present disclosures may include secondary memory 310 and may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and the removable storage unit 322 and the interface 320, which allow software and data to be transferred from the removable storage unit 322 to computer system 300.

Computer system 300 may also include a communications circuit 324. The communications circuit 324 may allow software and data to be transferred between computer system 300 and external devices. Examples of the communications circuit 324 may include a modem, a network interface (such as an Ethernet card), a communications port, a Personal Computer Memory Card International Association (PCMCIA) slot and card, etc. Software and data transferred via the communications circuit 324 are in the form of signals 328, which may be electronic, electromagnetic, optical or other signals capable of being received by the communications circuit 324. These signals 328 are provided to the communications circuit 324 via a communications path (e.g., channel) 326. This path 326 carries signals 328 and may be implemented using wire or cable, fiber optics, a telephone line, a cellular link, an RF link and/or other communications channels. In this document, the terms "computer program medium" and "computer usable medium" are used to refer generally to media such as the removable storage unit 318, a hard disk installed in hard disk drive 312, and signals 328. These computer program products provide software to the computer system 300. Aspects of the present disclosures are directed to such computer program products.

Computer programs (also referred to as computer control logic) are stored in main memory 308 and/or secondary memory 310. Computer programs may also be received via communications circuit 324. Such computer programs, when executed, enable the computer system 300 to perform the features in accordance with aspects of the present disclosures, as discussed herein. In particular, the computer programs, when executed, enable the processor 304 to perform the features in accordance with aspects of the present disclosures. Accordingly, such computer programs represent controllers of the computer system 300.

In an aspect of the present disclosures where the method is implemented using software, the software may be stored in a computer program product and loaded into computer system 300 using removable storage drive 314, hard disk drive 312, or the interface 320. The control logic (software), when executed by the processor 304, causes the processor 304 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method for determining state information by a reader, comprising:
    transmitting at least one incident radio frequency identification (RFID) signal to a RFID tag attached to a merchandize item;
    receiving at least one reflected RFID signal from the RFID tag;
    determining a frequency response of the RFID tag based on the at least one reflected RFID signal;
    comparing the frequency response to a plurality of baseline frequency responses; and
    determining a state of the RFID tag based on the comparing, wherein determining the state of the RFID tag comprises determining that the RFID tag is within a threshold distance from a person.

2. The method of claim 1, wherein determining the frequency response comprises determining one of a power response, a received signal strength indication, or phase information.

3. The method of claim 1, further comprising transmitting an indication signal to an alarm system or a security personnel indicating that the RFID tag is within the threshold distance from the person in response to determining that the RFID tag is within the threshold distance.

4. The method of claim 1, wherein determining the state of the RFID tag further comprises determining that the RFID tag is moving above a threshold speed.

5. The method of claim 4, further comprising transmitting an indication signal to an alarm system or a security personnel indicating that the RFID tag is moving above the threshold speed in response to determining that the RFID tag is moving above the threshold speed.

6. The method of claim 1, further comprising:
    transmitting a second incident RFID signal to the RFID tag;
    receiving a second reflected RFID signal from the RFID tag;
    determining a second frequency response of the RFID tag based on the second reflected RFID signal;
    comparing the second frequency response to the plurality of baseline frequency responses; and
    determining a state change of the RFID tag based on comparing the frequency response to a plurality of baseline frequency responses and comparing the second frequency response to the plurality of baseline frequency responses.

7. The method of claim 6, wherein the state change includes at least one of a change in a distance between the RFID tag and the reader, a change in proximity between the RFID tag and an object, or a change in a movement speed of the RFID tag.

8. The method of claim 7, wherein the object is a human body or a shelf.

9. A radio frequency identification (RFID) reader, comprising:
    a memory including instructions; and
    a processor configured to execute the instructions that cause the RFID reader to:
        transmit at least one incident radio frequency identification (RFID) signal to a RFID tag attached to a merchandize item;
        receive at least one reflected RFID signal from the RFID tag;
        determine a frequency response of the RFID tag based on the at least one reflected RFID signal;
        compare the frequency response to a plurality of baseline frequency responses; and
        determine a state of the RFID tag based on the comparing, wherein determining the state of the RFID tag comprises determining that the RFID tag is within a threshold distance from a person.

10. The RFID reader of claim 9, wherein determining the frequency response comprises determining one of a power response, a received signal strength indication, or phase information.

11. The RFID reader of claim 9, wherein the processor is further configured to execute the instructions that cause the RFID reader to transmit an indication signal to an alarm system or a security personnel indicating that the RFID tag is within the threshold distance from the person in response to determining that the RFID tag is within the threshold distance.

12. The RFID reader of claim 9, wherein determining the state of the RFID tag further comprises determining that the RFID tag is moving above a threshold speed.

13. The RFID reader of claim 12, wherein the processor is further configured to execute the instructions that cause the RFID reader to transmit an indication signal to an alarm system or a security personnel indicating that the RFID tag is moving above the threshold speed in response to determining that the RFID tag is moving above the threshold speed.

14. The RFID reader of claim 9, wherein the processor is further configured to execute the instructions that cause the RFID reader to:
    transmit a second incident RFID signal to the RFID tag;
    receive a second reflected RFID signal from the RFID tag;
    determine a second frequency response of the RFID tag based on the second reflected RFID signal;
    compare the second frequency response to the plurality of baseline frequency responses; and
    determine a state change of the RFID tag based on comparing the frequency response to a plurality of baseline frequency responses and comparing the second frequency response to the plurality of baseline frequency responses.

15. The RFID reader of claim 14, wherein the state change includes at least one of a change in a distance between the RFID tag and the reader, a change in proximity between the RFID tag and an object, or a change in a movement speed of the RFID tag.

16. The RFID reader of claim 15, wherein the object is a human body or a shelf.

17. A non-transitory computer readable medium comprising instructions that, when executed by a processor of a radio frequency identification (RFID) reader, cause the processor to:
 transmit at least one incident radio frequency identification (RFID) signal to a RFID tag attached to a merchandize item;
 receive at least one reflected RFID signal from the RFID tag;
 determine a frequency response of the RFID tag based on the at least one reflected RFID signal;
 compare the frequency response to a plurality of baseline frequency responses; and
 determine a state of the RFID tag based on the comparing, wherein the instructions for determining the state of the RFID tag comprises instructions for determining that the RFID tag is within a threshold distance from a person.

18. The non-transitory computer readable medium of claim 17, wherein the instructions for determining the frequency response comprises instructions for determining one of a power response, a received signal strength indication, or phase information.

19. The non-transitory computer readable medium of claim 17, further comprising instructions that, when executed by the processor, cause the processor to transmit an indication signal to an alarm system or a security personnel indicating that the RFID tag is within the threshold distance from the person in response to determining that the RFID tag is within the threshold distance.

20. The non-transitory computer readable medium of claim 17, wherein the instructions for determining the state of the RFID tag further comprises instructions for determining that the RFID tag is moving above a threshold speed.

21. The non-transitory computer readable medium of claim 20, further comprising instructions that, when executed by the processor, cause the processor to transmit an indication signal to an alarm system or a security personnel indicating that the RFID tag is moving above the threshold speed in response to determining that the RFID tag is moving above the threshold speed.

22. The non-transitory computer readable medium of claim 17, further comprising instructions that, when executed by the processor, cause the processor to:
 transmit a second incident RFID signal to the RFID tag;
 receive a second reflected RFID signal from the RFID tag;
 determine a second frequency response of the RFID tag based on the second reflected RFID signal;
 compare the second frequency response to the plurality of baseline frequency responses; and
 determine a state change of the RFID tag based on comparing the frequency response to a plurality of baseline frequency responses and comparing the second frequency response to the plurality of baseline frequency responses.

23. The non-transitory computer readable medium of claim 22, wherein the state change includes at least one of a change in a distance between the RFID tag and the RFID reader, a change in proximity between the RFID tag and an object, or a change in a movement speed of the RFID tag.

24. The non-transitory computer readable medium of claim 23, wherein the object is a human body or a shelf.

* * * * *